United States Patent
Doering

(10) Patent No.: US 9,733,139 B2
(45) Date of Patent: Aug. 15, 2017

(54) VERTICAL MEMBRANES FOR PRESSURE SENSING APPLICATIONS

(71) Applicant: Silicon Microstructures, Inc., Milpitas, CA (US)

(72) Inventor: Holger Doering, Sunnyvale, CA (US)

(73) Assignee: Silicon Microstructures, Inc., Milpitas, CA (US)

( * ) Notice: Subject to any disclaimer, the term of this patent is extended or adjusted under 35 U.S.C. 154(b) by 329 days.

(21) Appl. No.: 14/269,052

(22) Filed: May 2, 2014

(65) Prior Publication Data

US 2015/0316436 A1 Nov. 5, 2015

(51) Int. Cl.
*G01L 9/02* (2006.01)
*G01L 9/00* (2006.01)
*G01L 19/06* (2006.01)

(52) U.S. Cl.
CPC .......... *G01L 9/0047* (2013.01); *G01L 9/0051* (2013.01); *G01L 19/0618* (2013.01)

(58) Field of Classification Search
CPC .................................................. G01L 9/0051
USPC .......... 73/715, 716, 725, 730; 257/415, 417, 257/419
See application file for complete search history.

(56) References Cited

U.S. PATENT DOCUMENTS

| | | | | |
|---|---|---|---|---|
| 6,006,607 A * | 12/1999 | Bryzek et al. | ........ | G01L 9/0054 338/42 |
| 6,662,663 B2 | 12/2003 | Chen | | |
| 7,832,279 B2 * | 11/2010 | Kautzsch et al. | ..... | G01L 9/0052 73/754 |
| 8,471,346 B2 | 6/2013 | Kautzsch et al. | | |
| 2002/0003274 A1* | 1/2002 | Bryzek et al. | ........ | G01L 9/0054 257/414 |
| 2010/0139408 A1* | 6/2010 | Kurtz et al. | .......... | G01L 13/025 73/716 |
| 2010/0218613 A1* | 9/2010 | Kautzsch et al. | ..... | G01L 9/0052 73/724 |
| 2010/0281991 A1* | 11/2010 | Seeberg | ................ | G01L 13/028 73/716 |
| 2013/0233085 A1* | 9/2013 | Mizoguti et al. | ....... | G01L 7/022 73/716 |
| 2013/0340532 A1* | 12/2013 | Wohlgemuth | .......... | G01L 19/06 73/716 |

OTHER PUBLICATIONS

Authors: T. Suni, K. Henttinen, A. Lipsanen, J. Dekker, H. Luoto, and M. Kulawski, Title: Wafer Scale Packaging of MEMS by Using Plasma-Activated Wafer Bonding, Date: Dec. 6, 2005, Publisher:The Electrochemical Society, Inc., Journal of The Electrochemical Society, 153 (1) G78-G82, pp. B/1-B/5.*
Authors: Kanakasabapathi Subramanian, Jeffrey B. Fortin, and Kuna Kishore, Title: Scalable Vertical Diaphragm Pressure Sensors: Device and Process Design, Design for Packaging, Date: Jun. 2006, Publication: IEEE Sensors Journal, vol. 6, No. 3, pp. 618-622.*

* cited by examiner

Primary Examiner — Lisa Caputo
Assistant Examiner — Roger Hernandez-Prewitt
(74) Attorney, Agent, or Firm — Kilpatrick Townsend & Stockton, LLP

(57) ABSTRACT

Pressure sensors having vertical diaphragms or membranes. A vertical diaphragm may be located in a first silicon wafer between a first and second cavity, where the first and second cavities are covered by a second silicon wafer. One or more active or passive devices or components may be located on a top of the vertical diaphragm.

10 Claims, 13 Drawing Sheets

VERTICAL MEMBRANES FOR PRESSURE SENSING APPLICATIONS

BACKGROUND

Pressure sensing devices have become ubiquitous the past few years as they have found their way into many types of products. Utilized in automotive, industrial, consumer, and medical products, the demand for pressure sensing devices has skyrocketed and shows no signs of abating.

Pressure sensing devices may include pressure sensors as well as other components. Pressure sensors may typically include a diaphragm or membrane. When a pressure sensor in a pressure sensing device experiences a pressure, the membrane responds by changing shape. This change in shape causes one or more characteristics of electronic components on the membrane to change. These changing characteristics can be measured, and from these measurements, the pressure can be determined.

Often, the electronic components are resistors that are configured as a Wheatstone bridge located on the membrane. As the membrane distorts under pressure, the resistance of the resistors also changes. This change results in an output of the Wheatstone bridge. This change can be measured through wires or leads attached to the resistors.

These pressure sensors may be manufactured as die on one or more silicon wafers. These one or more silicon wafers may be fairly costly to procure and to handle. Further, these one or more silicon wafers may undergo multiple processing steps, each requiring the use of expensive equipment and chemicals as well as the time of highly qualified individuals. Accordingly, the costs for these processed wafers may be high.

The cost of manufacturing each salable die is proportional to these costs divided by the number of functional die per wafer. Accordingly, to reduce the cost of each functional die, it may be desirable to reduce the size of each die. This may increase the net number of die per wafer. It may also be desirable to manufacture the die using a reliable process in order to increase the percentage of die that are functional. This may increase the number of functional die per wafer.

Thus, what is needed are pressure sensors having a reduced size and that may be reliably manufactured.

SUMMARY

Accordingly, embodiments of the present invention may provide pressure sensors having a reduced size and that may be reliably manufactured. An illustrative embodiment of the present invention may provide a pressure sensor having a reduced area by using a vertical membrane in place of a convention horizontal membrane. These vertical membranes may be smaller in lateral dimensions as compared to conventional horizontal membranes. These smaller dimensions may allow more die to be formed on each wafer, thereby decreasing the cost of manufacturing per net pressure sensor die.

Another illustrative embodiment of the present invention may provide pressure sensors that may be reliably manufactured. These pressure sensors may rely on the well-controlled tolerances of integrated circuit technologies to form a highly repeatable vertical membrane. These reliable manufacturing techniques may increase the percentage of die that are functional. This, along with the above increase in the net number of die-per-wafer, may reduce the cost of manufacturing each functional salable die.

An illustrative embodiment of the present invention may provide a pressure sensor having a vertical diaphragm. The vertical diaphragm may be located in a first silicon wafer between a first and second cavity, where the first and second cavities are covered by a second silicon wafer. The portions of the second silicon wafer over the first and second cavities may act as first and second horizontal diaphragms, though typically the second silicon wafer is of sufficient thickness that this is negligible. One or more devices may be located on a top of the second silicon wafer. For example, in various embodiments of the present invention, the one or more devices may be located over the vertical membrane, the first cavity, the second cavity, a frame portion of the pressure sensor around the first and second cavity, or over other portions of the pressure sensor. In this and other embodiments of the present invention, one or more components may be located on one or more of the inside surfaces of either or both cavities, the bottom of the pressure sensor, or other location.

An illustrative embodiment of the present invention may provide pressure sensors that are readily manufactured. For example, in this and other embodiments of the present invention, pressure sensors may be formed using only two wafers. That is, a first and a second recess may be formed in a top of a first wafer while a second wafer may cover the top of the first wafer. In this way, a first and second cavity may be formed by the first and second recesses and a bottom of the second wafer. A vertical membrane may be formed between the first and second cavity. By using only two wafers to form a pressure sensor, manufacturing costs per die may be further reduced.

An illustrative embodiment of the present invention may provide pressure sensors that are reliably manufactured. Specifically, integrated circuit manufacturing technologies are highly geared to printing and forming lateral structures. An illustrative embodiment of the present invention may utilize standard CMOS processing to provide pressure sensors employing vertical membranes formed between two such lateral structures. That is, embodiments of the present invention may include vertical membranes that are defined by the placement of two lateral recesses or cavities. By utilizing these well-controlled manufacturing steps, the yield, or percentage of useable die on each wafer, may be increased, thereby further reducing the cost of each functional pressure sensor die.

These vertical membranes may be less fragile than conventional horizontal membranes. Since they are substantially internal devices, they may also be less susceptible to subsequent processing steps. This may further help to increase yields and reduce per-unit costs.

An illustrative embodiment of the present invention may provide a method of manufacturing a pressure sensor. An oxide layer may be formed on a top of a first wafer. The oxide may be etched to form a first and a second opening. The method may further include forming a first recess or cavity and a second recess or cavity in a top of a first wafer at the location of the first and second openings. The first recess or cavity and the second recess or cavity may be formed using a deep-reactive ion etch (DRIE) or other technology. A second wafer may have a bottom side fusion or anodically bonded or otherwise attached to the top side of the first wafer.

In this and other embodiments of the present invention, one or more components may be formed on a top side of the second wafer. For example, the one or more devices may be located over the vertical membrane, the first cavity, the second cavity, a frame portion of the pressure sensor around the first and second cavity, or on other portions of the pressure sensor. In this and other embodiments of the present invention, one or more components may be located on one or more of the inside surfaces of the cavity, the bottom of the pressure sensor, or other location. These components may be active devices such as field-effect transistors, they may be passive devices such as resistors or capacitors, or they may be other active or passive devices, components, or circuits. In a specific embodiment of the present invention, one or more resistors may be formed over a vertical membrane. The resistors may have a high concentration (p+ or n+) region near a surface of the pressure sensor in order to reduce contact impedance. The resistors may have a lower concentration region (p− or n−) along sides of the membrane for a resistor body. The resistor bodies, and in particular highly pressure-sensitive p− or n− resistor bodies, may be implanted or diffused into the sides or other portions of the vertical membrane itself.

In this and other embodiments of the present invention, the sensitivity of a pressure sensor may be increased in various ways. For example, a portion of a wafer forming a top of a cavity may act as a second diaphragm or membrane in conjunction with a vertical membrane. The top wafer may be thinned to increase pressure sensor sensitivity, though typically the top wafer is sufficiently thick that this effect is negligible. This sensitivity may further be adjusted with the use of racetracks, trenches, beams, bosses, or other structures.

Embodiments of the present invention may be used to form different types of pressure sensors. For example, embodiments of the present invention may provide absolute pressure sensors, differential pressure sensors, gauge pressure sensors, and other types of pressure sensors. Fluid to be measured may access either or both cavities through passages or vias extending from a top of a top wafer to a cavity or from a bottom of a bottom wafer to a cavity. In harsh environments, a passageway from a bottom of a bottom wafer to a cavity may be used to protect sensitive devices or traces and other connections at a top of the pressure sensor from direct exposure to the fluid. In various embodiments of the present invention, either cavity may be sealed and not have such a passageway or via. A sealed cavity may be sealed with a pressure of a vacuum, a pressure of one-atmosphere, or other appropriate pressure.

Another illustrative embodiment of the present invention may provide a pressure sensor capable of measuring pressure over an increased range. In one embodiment of the present invention, a first cavity and a second cavity may have a vertical wall forming a vertical membrane between them. The vertical membrane may have a thickness that varies along its length. The variation may be linear, curved, stepped, or it may follow another function. The variation may be symmetrical or the variation may be asymmetrical. Components may be placed at different points along or near the vertical membrane. Components at or near thinner portions of the vertical membrane may be used to measure low pressures, while components at or near thicker portions of the vertical membrane may be used to measure high pressures.

In various embodiments of the present invention, an amount that a vertical membrane may deflect may be limited to avoid damage. An illustrative embodiment of the present invention may employ a stop or boss to limit a deflection of a membrane. For example, pressure sensors according to embodiments of the present invention may include a boss or stop that extends from a wall of a cavity opposite a membrane. The boss or stop may extend to a close proximity to the vertical membrane. In this way, deflection of the vertical membrane due to excessive pressures may be limited before damage may occur.

Embodiments of the present invention may provide pressure sensors having a relatively thin or narrow form factor. That is, these pressure sensors may have a length-to-width ratio that is much higher than 1. This aspect ratio may come about due to the use of a long, narrow vertical membrane. A pressure sensor having such a form factor may be efficiently placed next to an integrated circuit, such as an application-specific integrated circuit. For example, a pressure sensing device may include a pressure sensor having this form factor next to an ASIC device designed to read and process information from the pressure sensor. To the extent that the pressure sensor has the same length as an adjacent side of the ASIC (and a resulting shorter width), the combined area of the pressure sensor and ASIC may be reduced.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
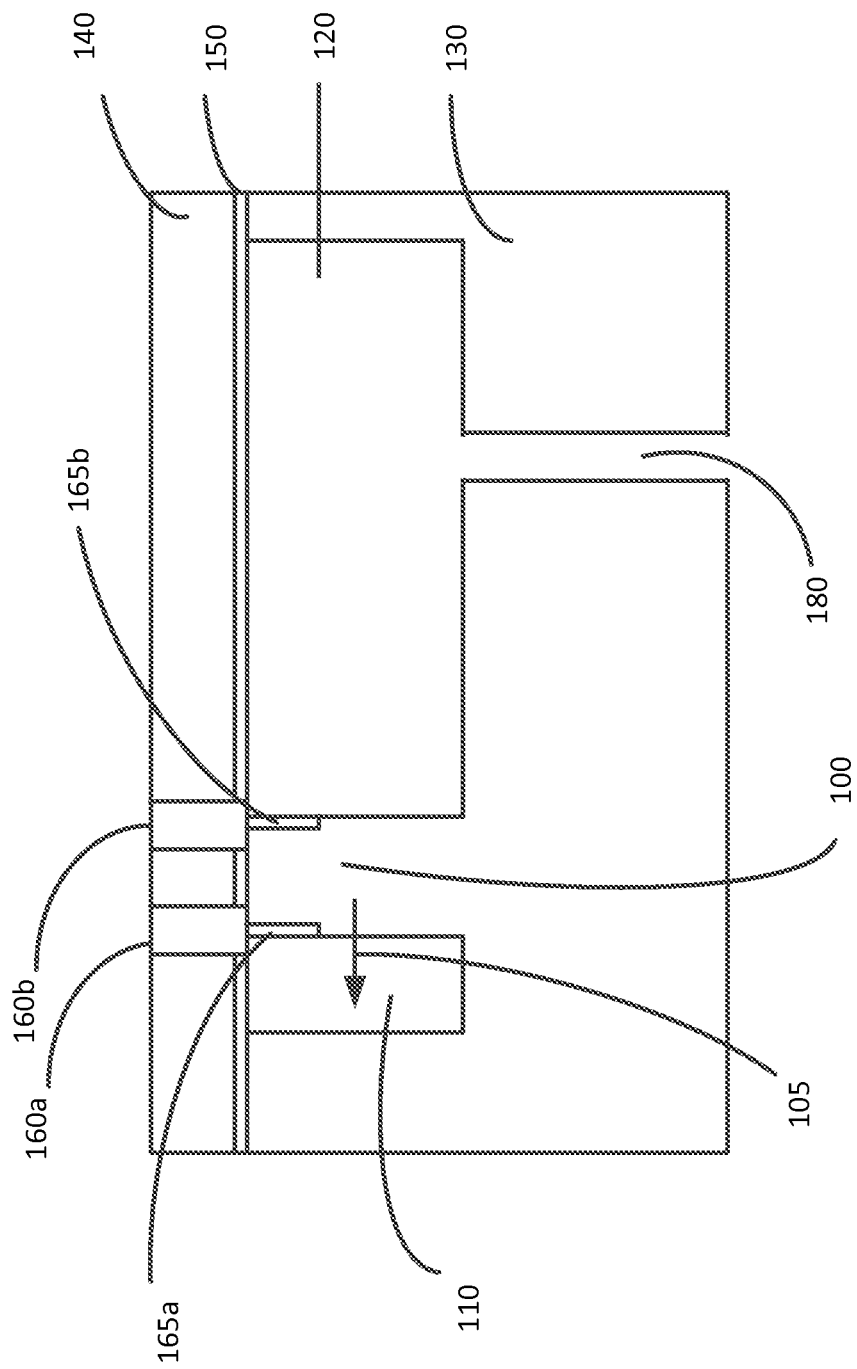
FIG. 1 illustrates a side view of a pressure sensor according to an embodiment of the present invention.

FIG. 1 illustrates a side view of a pressure sensor according to an embodiment of the present invention. This figure, as with the other included figures, is shown for illustrative purposes and does not limit either the possible embodiments of the present invention or the claims.

This pressure sensor may include a vertical membrane 100 formed between two cavities 110 and 120. Cavity 110 and cavity 120 may be formed in a first wafer 130. A second wafer 140 may have a bottom side attached to a top side of first wafer 130, with an oxide layer 150 between them. One or more active or passive devices or components, such as resistors, may be formed in a top side of second wafer 140. In other embodiments, such as this example, one or more resistors may be formed in a top side of second wafer 140 and in first wafer 130. The resistors may have high concentration p+regions 160a and 160b (collectively referred to as 160) in second wafer 140 for reducing contact resistance and low concentration p– body regions 165a and 165b (collectively referred to as 165) in sides of membrane 100 in first wafer 130. Resistor contact regions 165 may extend into membrane 100 to connect to resistor body regions 165. The resistor formed by regions 160a and 165a may experience a compressive force and the resistor formed by regions 160b and 165b may experience a tensile force when a positive pressure is applied to second cavity 120 relative to first cavity 110.

Various embodiments of the present invention may provide different types of pressure sensors. For example, embodiments of the present invention may provide absolute, differential, gauge, sealed, or other types of pressure sensors. In this specific example, the pressure sensor may be a sealed or absolute pressure sensor. Specifically, cavity 110 may be sealed and may be under a reference pressure that is a vacuum, one-atmosphere, or other pressure. Cavity 120 may be accessible by a fluid to be measured via first passage 180. Passage 180 may extend from a bottom of first wafer 130 to cavity 120. A fluid to be measured may pass through opening 180 to reach cavity 120. When the pressure of the fluid in cavity 120 is greater than the reference pressure in cavity 110, the vertical diaphragm or membrane 100 may flex, bending in a direction 105. A thinner vertical diaphragm or membrane 100 may result in a vertical diaphragm or membrane 100 that may flex or deflect a greater amount. This in turn may lead to an increase in sensitivity of the pressure sensor.

In this example, diaphragm or membrane 100 is vertical, as compared to a conventional horizontal diaphragm. This positioning may save space and allow for an increase in a number of die per wafer. This in turn may reduce die costs.

Portions of the second wafer 140 over cavities 110 and 120 may also act as horizontal diaphragms, though typically second wafer 140 is sufficiently thick that this effect is negligible. The thickness of the top or second wafer 140 may be thinned to further increase the sensitivity of the horizontal diaphragms, though this may cause a reduction in sensitivity of the vertical membrane. That is, for a given pressure, any deflection of the horizontal diaphragms may result in a decreased deflection in the vertical membrane, thereby appearing to make the vertical membrane less sensitive. To the extent that this may be used to adjust or tune an effective sensitivity of the vertical membrane, it may be desirable. To the extent that it simply reduces sensitivity of the vertical membrane, it may not be desirable.

Various embodiments of the present invention may provide various methods for manufacturing pressure sensors. An example is shown in the following figures.

Figure 2:
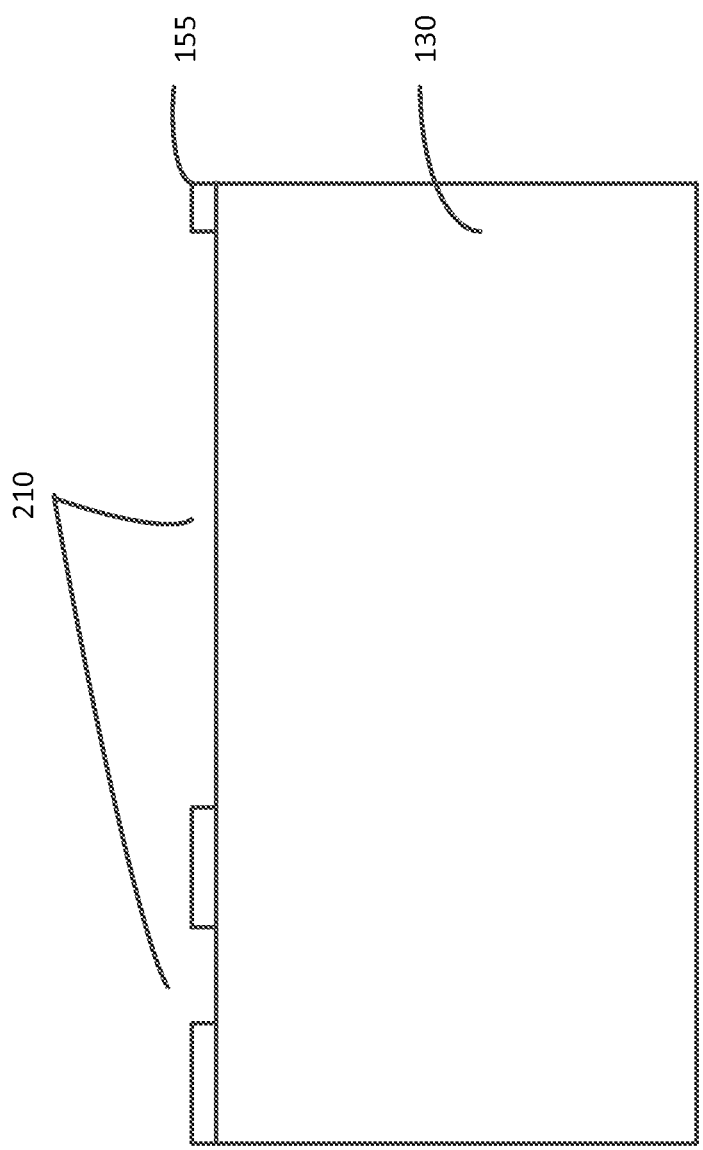
FIG. 2 illustrates a portion of a pressure sensor being manufactured according to an embodiment of the present invention.

FIG. 2 illustrates a portion of a pressure sensor being manufactured according to an embodiment of the present invention. A first wafer 130 has been provided. An oxide layer 155 has been grown on a top surface of first wafer 130. Openings 210 have been patterned and etched in the oxide layer 155.

Figure 3:
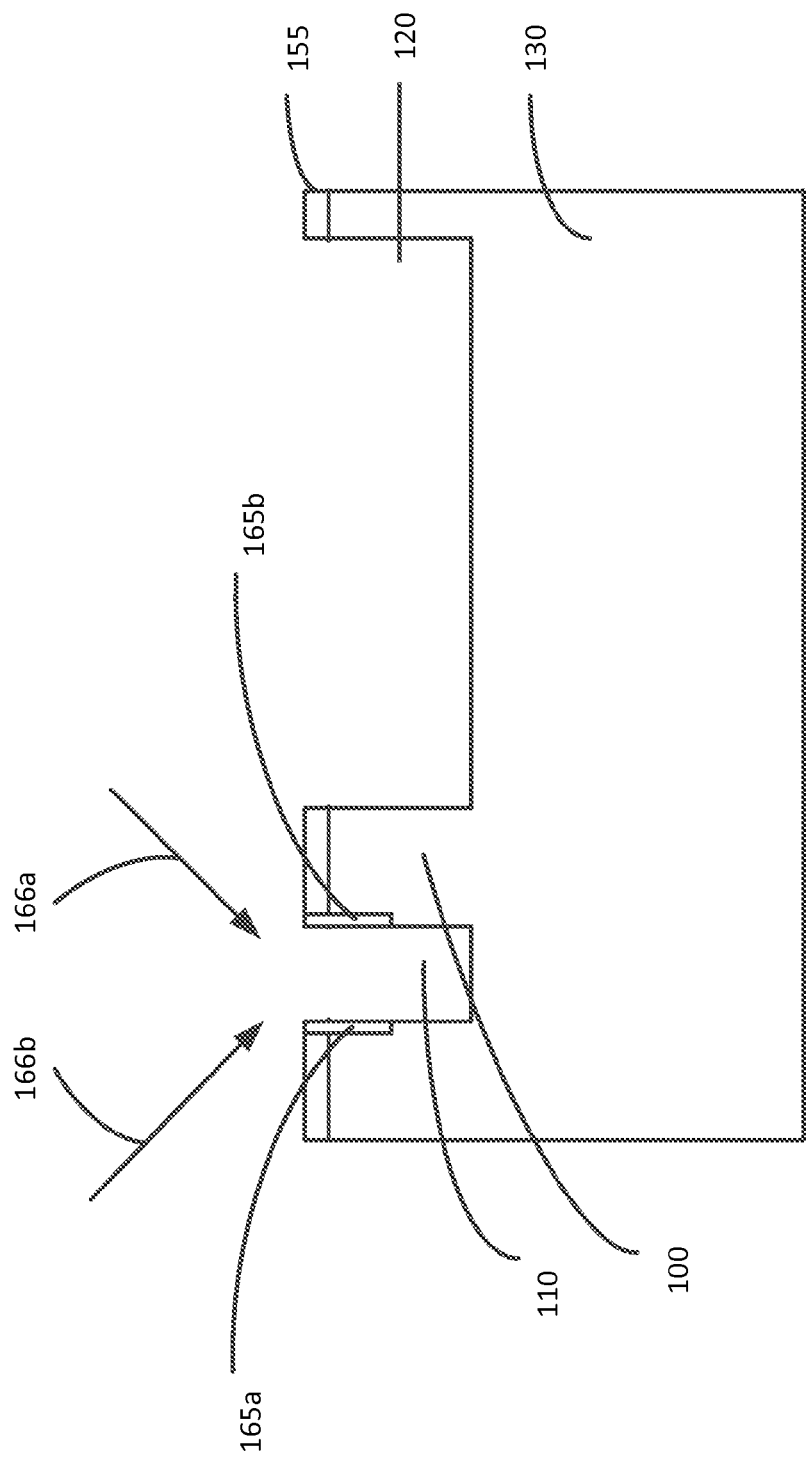
FIG. 3 illustrates a portion of a pressure sensor being manufactured according to an embodiment of the present invention.

FIG. 3 illustrates a portion of a pressure sensor being manufactured according to an embodiment of the present invention. In this step, wells or recesses 110 and 120 (which will form sides and bottoms of cavities 110 and 120 in a following step) may be formed in a first wafer 130 in locations where oxide 155 is not present. In a specific embodiment of the present invention, wells or recesses 110 and 120 may be formed using a deep reactive ion etch, or other etch or micromachining technique. Specifically, portions of oxide layer 155 may block this etch, while the etching process may remove silicon below openings 210 shown in FIG. 2. The formation of wells or recesses 110 and 120 may leave vertical membrane 100 in place.

Once wells or recesses 110 and 120 are formed, resistor regions 165 may be formed in membrane 100. For example, resistor regions 165 may be formed in sides of membrane 100. Regions 165 may be implanted at an angle, for example a 30, 45, or 60 degree angle, or a 0, 15, or 75 degree angle and corresponding negative angles (relative to an oblique or normal direction from a top surface of first wafer 130.) A 45 degree angle 166a is shown as an example, indicating that region 165a may be implanted at a 45 degree angle, while region 165b may be implanted at a –45 degree angle 166b.

Again, conventional integrated circuit manufacturing techniques are geared toward forming lateral horizontal structures. Accordingly, a thickness of vertical membrane 100 may be well-controlled using convention techniques. This may in turn make the manufacture of these pressure sensors more reliable, thereby increasing yields and lowering die costs.

Figure 4:
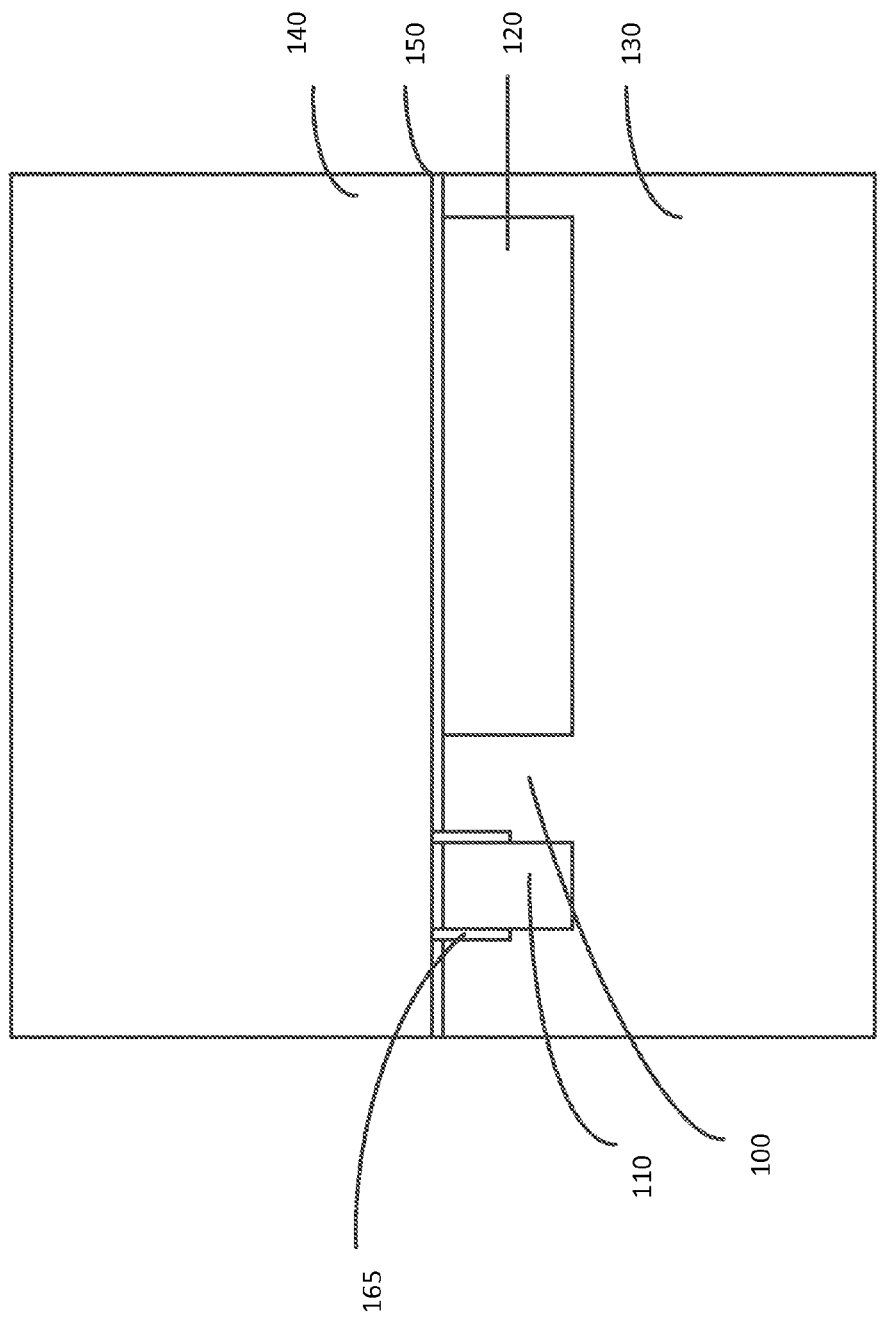
FIG. 4 illustrates a portion of a pressure sensor being manufactured according to an embodiment of the present invention.

FIG. 4 illustrates a portion of a pressure sensor being manufactured according to an embodiment of the present invention. In this step, a second wafer 140 may be fusion or anodically bonded or otherwise attached to first wafer 130. In various embodiments of the present invention, an oxide layer 150 may be grown on a bottom of wafer 140. This oxide layer 150 may interface with an oxide layer 155 on a top of first wafer 130, though only oxide layer 150 is shown here for simplicity. In other embodiments of the present invention, the silicon bottom surface of the second wafer 140 may directly attach to what remains of oxide layer 155 on a top surface of the first wafer 130. In still other embodiments of the present invention, no oxide layer is used and silicon at the bottom of second wafer 140 may be bonded to silicon at the top of first wafer 130. In still another embodiment of the present invention, oxide layer 155 may be removed and a top of first wafer 130 may be fusion or anodically bonded to an oxide layer 150 on a bottom of second wafer 140.

With the attachment of second wafer 140, cavities 110 and 120 may be formed, thereby defining vertical membrane 100.

Figure 5:
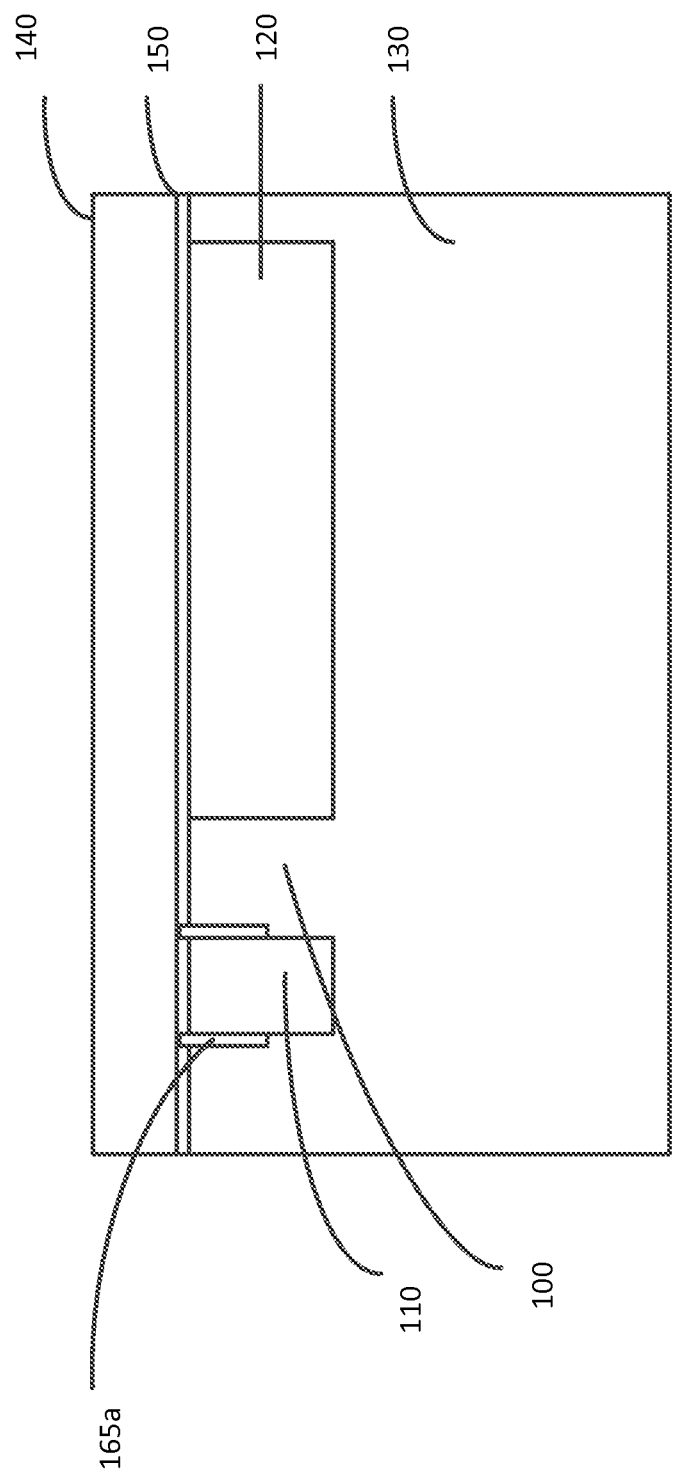
FIG. 5 illustrates a portion of a pressure sensor being manufactured according to an embodiment of the present invention.

FIG. 5 illustrates a portion of a pressure sensor being manufactured according to an embodiment of the present invention. In this step, second wafer 140 has been thinned. This thinning may be done by etching, grinding, or other chemical or micromechanical procedures or techniques. Again, the potions of second wafer 140 over cavities 110 and 120 in wafer 130 may act as horizontal diaphragms or membranes. Accordingly, a thickness of second wafer 140 may be adjusted to adjust the sensitivity of the pressure sensor, though typically second wafer 140 is sufficiently thick that this effect is negligible.

Figure 6:
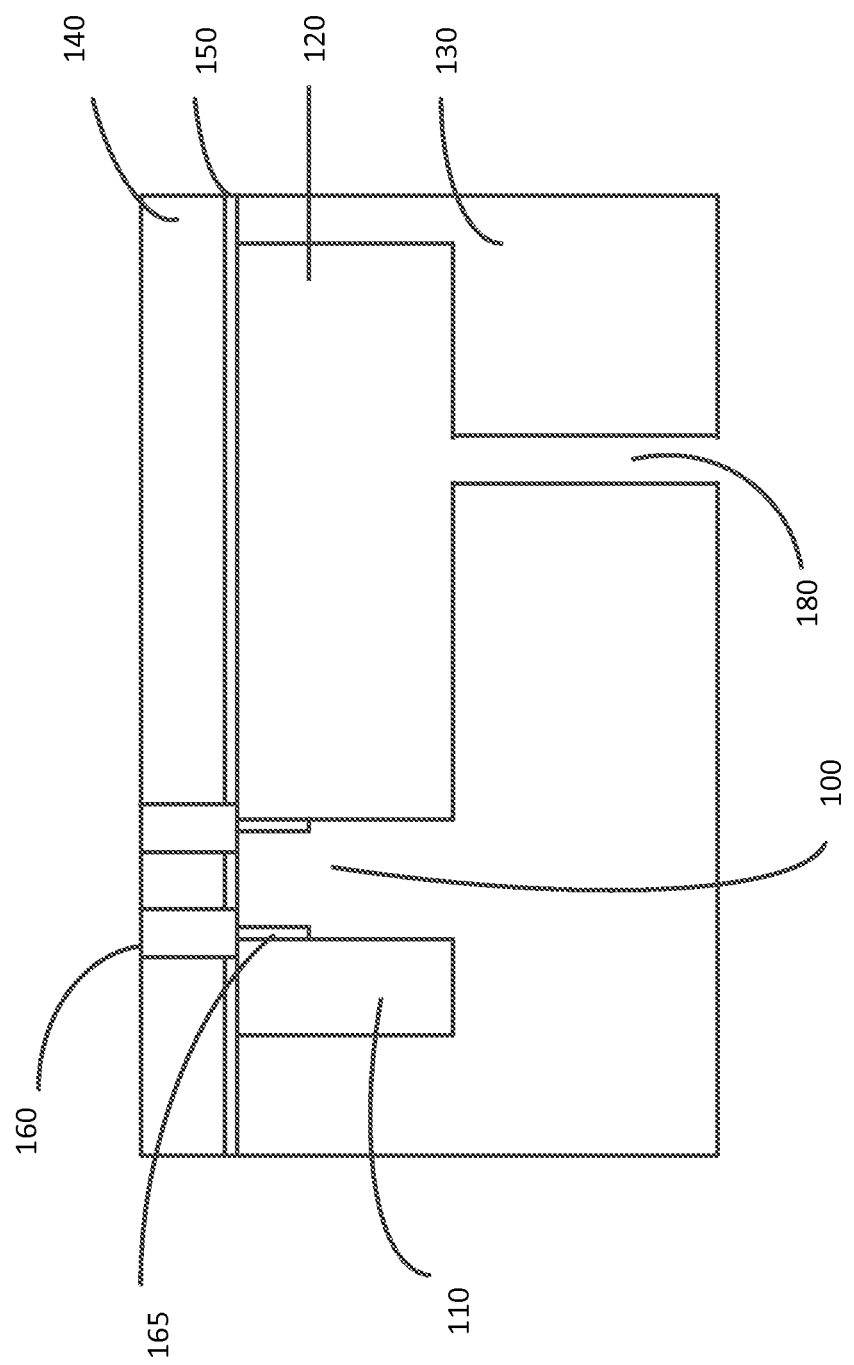
FIG. 6 illustrates a portion of a pressure sensor being manufactured according to an embodiment of the present invention.

FIG. 6 illustrates a portion of a pressure sensor being manufactured according to an embodiment of the present invention. In this step, one or more devices may be formed in a top side of second wafer 140. In various embodiments of the present invention, these devices may be active or passive. For example, they may be active devices or components such as bipolar or field effect transistors, or they may be passive devices or components such as resistors, capacitors, inductors, or other devices, components, or circuits. These components, devices, or circuits may be placed over vertical membrane 100, over either or both cavities 110 and 120, over a frame around these cavities or other portions of the pressure sensor, or at other locations on or in the pressure sensor. In various embodiments of the present invention, devices or components may also be formed on vertical membrane 100, on a surface of cavities 110 or 120, or along a bottom side of first wafer 130. In this particular example, resistor contact regions 160 may be formed in second wafer 140, where the resistor contact regions are high concentration p+ regions 160 for reducing contact resistance to a metal trace on a top surface of second wafer 140 (not shown) and between the trace and the low concentration p− body region 165. In various embodiments of the present invention, regions 160 and 165 may be implanted or diffused.

As with the other examples, oxide layer 150, as with oxide layer 150 in FIG. 1 and oxide layers 850 and 950 in FIGS. 8 and 9 below, may be omitted. Oxide layer 150 may be an oxide layer grown on a bottom of second wafer 140, it may be an oxide layer grown on a top of first wafer 130 (in which case it would not be present in a top surface of cavities 110 and 120), or it may be a combination of oxide layers on both wafers.

Again, embodiments of the present invention may provide various types of pressure sensors, such as sealed or absolute pressure sensors. Accordingly, one of the cavities 110 or 120 may remain sealed, while another may be provided a passage to an external environment. In a specific embodiment of the present invention, a passageway, such as passageway 180, shown here and in FIG. 1, may be provided. In this way, a bottom surface of first wafer 130 may be exposed to a fluid. This may allow exposure of the pressure sensor to a harsher environment than may be tolerable if a top surface of second wafer 140 was exposed, since sensitive components or traces and other connections may be located on a top surface of second wafer 140.

In various embodiments of the present invention, passageway 180 may be formed at different times. For example, it may be desirable to prevent cleaning fluid from entering cavity 120. In this case, the formation of passageway 180 may be deferred towards an end of processing of the pressure sensor.

Figure 7:
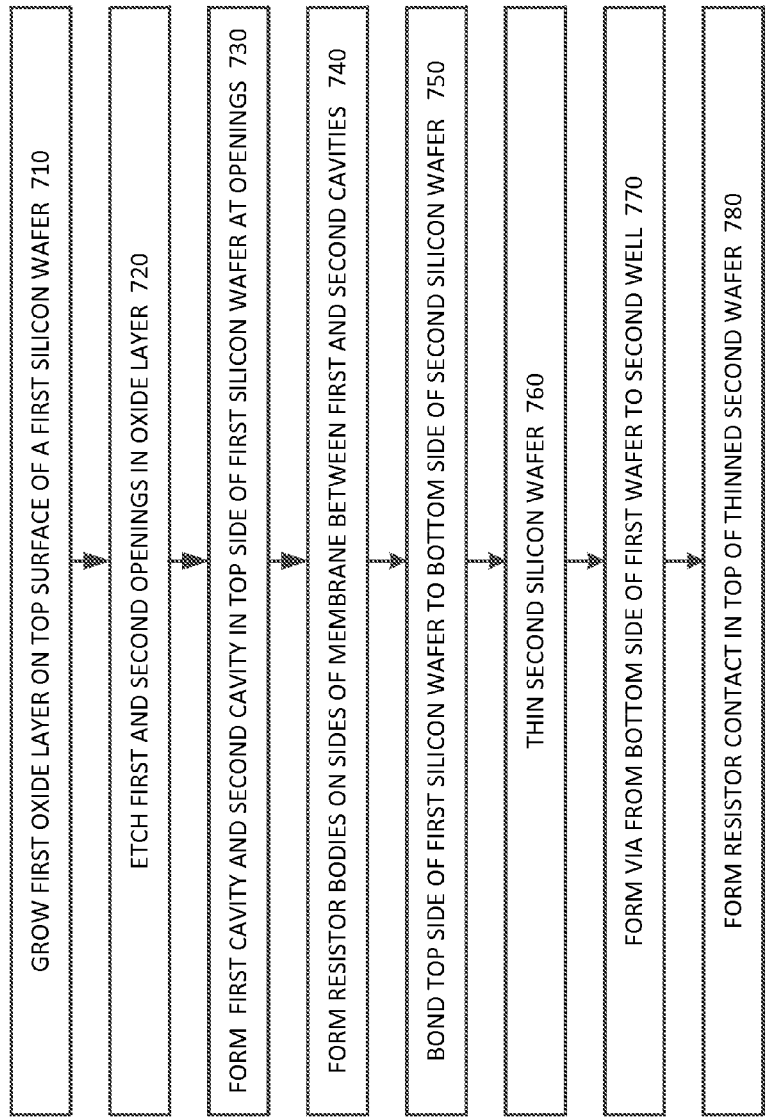
FIG. 7 illustrates a flowchart of a method of forming a pressure sensor according to an embodiment of the present invention.

FIG. 7 illustrates a flowchart of a method of forming a pressure sensor according to an embodiment of the present invention. In act 710, a first oxide layer may be grown on a surface of a first wafer. Openings may be etched in the oxide layer in act 720. A first well and a second well may be formed at these openings in act 730. Resistor bodies may be formed in sides of the membrane in act 740. A top side of the first wafer may be fusion or anodically bonded to a bottom side of the second wafer in act 750, thereby sealing the first and second wells to form a first and second cavity. The second wafer may be thinned in act 760. A passage or via may be formed from the bottom side of the first wafer to the second cavity or well in act 770. One or more devices, such as resistor contact regions, may be formed in a top of the thinned second wafer in act 780. These acts may be varied in order, some acts may be omitted, and some acts may be added in various embodiments of the present invention. For example, the passage or via formed in act 770 may be formed after one or more devices are formed in a top side of the second wafer in act 780.

Again, one or more components may be formed in a top side of the second wafer. These components may be placed over the cavities, vertical membranes, frames, or other portions of the pressure sensors. Also, passages to external environments may be provided in different locations. Examples are shown in the following figures.

Figure 8:
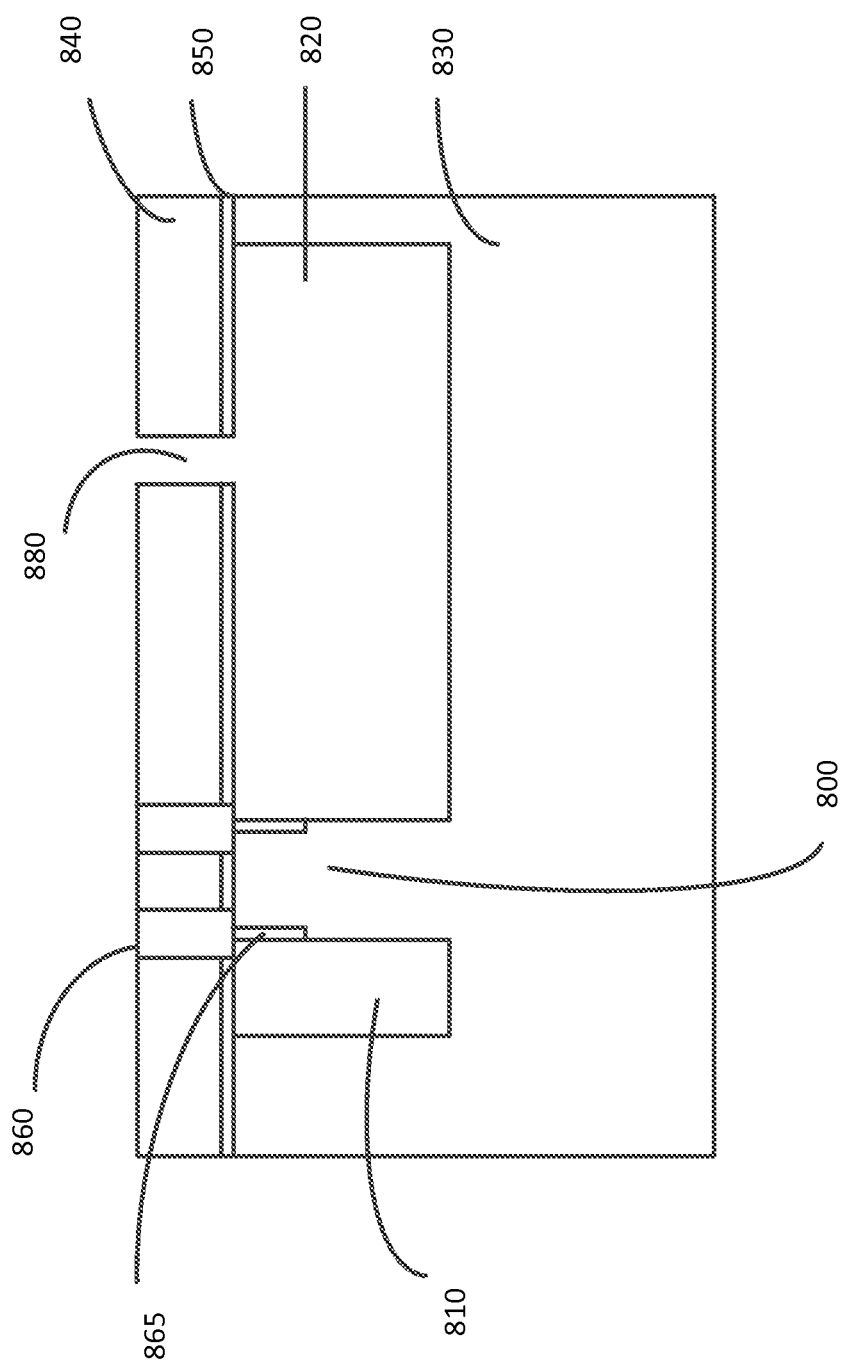
FIG. 8 illustrates another pressure sensor according to an embodiment of the present invention.

FIG. 8 illustrates another pressure sensor according to an embodiment of the present invention. In this example, cavities 810 and 820 may be formed in first wafer 830, thereby defining vertical membrane 800. An oxide layer 850 may be located between a bottom of a second wafer 840 and a top surface of first wafer 830, though in other embodiments of the present invention, oxide layer 850, as with oxide layer 150 in FIGS. 1 and 6 and oxide layer 950 in FIG. 9 below, may be omitted. Oxide layer 850 may be an oxide layer grown on a bottom of second wafer 840, it may be an oxide layer grown on a top of first wafer 830 (in which case it would not be present in a top surface of cavities 810 and 820), or it may be a combination of oxide layers on both wafers.

One or more resistors formed by regions 860 and 865 may be formed in a top of second wafer 840 over vertical membrane 800. Resistor contact regions 860 may be a highly doped p-type contact area. Resistor contact regions 860 may be a high concentration area formed at a low energy for a shallow depth in order to reduce contact resistance. Resistor body region 865 may be a lower doped p-type region. Resistor body region 865 may be a low concentration area formed at a high energy for a deeper depth. Resistor contact region 860 may extend into vertical membrane 800 itself to connect to resistor body region 865. These or similar resistors may be used in this and the other embodiments shown herein, including the examples in FIGS. 1, 6, and 9, as well as in other embodiments of the present invention. Also, other components, such as transistors, capacitors, or other active or passive components, may be used here along with or instead of resistor regions 860 and 865.

In this example, cavity 820 may be a sealed reference cavity, while cavity 810 may be exposed to an external environment via passage 880. Sealed cavity 820 may be sealed at a pressure of a vacuum, a pressure of one-atmosphere, or at another appropriate pressure.

Again, embodiments of the present invention may provide various types of pressure sensors, such a differential pressure sensors. An example is shown in the following figure.

Figure 9:
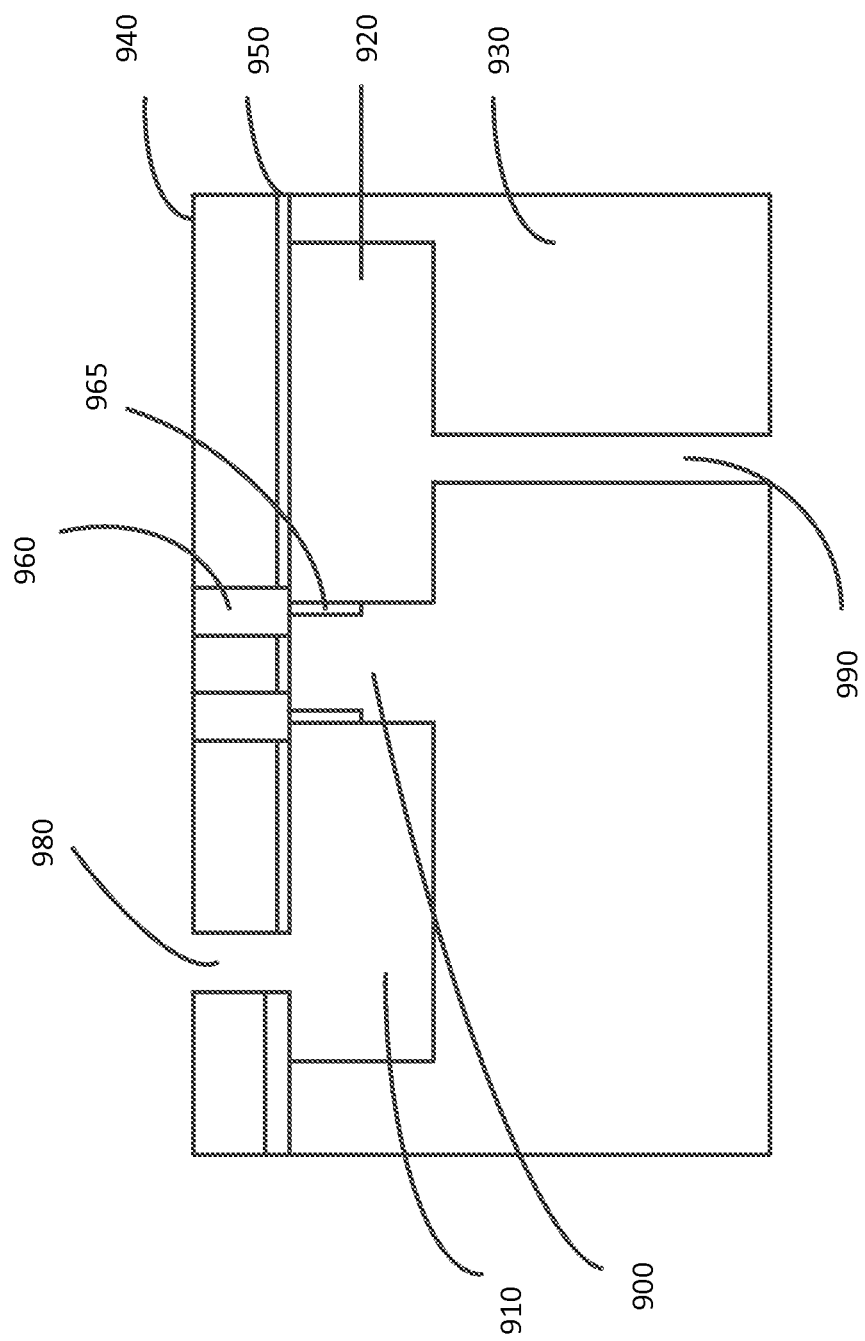
FIG. 9 illustrates another pressure sensor according to an embodiment of the present invention.

FIG. 9 illustrates another pressure sensor according to an embodiment of the present invention. Cavities 910 and 920 may be formed in first wafer 930. A second wafer 940 may have a bottom side attached to a top side of first wafer 930, with an intervening oxide layer 950. Again, oxide layer 950 may be omitted in various embodiments of the present invention. Oxide layer 950 may be an oxide layer grown on a bottom of second wafer 940, it may be a layer grown on a top of first wafer 930 (in which case it would not be present in a top surface of cavities 910 and 920), or it may be a combination of oxide layers on both wafers.

One or more resistors formed by high concentration regions 960 and low concentration regions 965 may be formed over vertical membrane 900. These regions may correspond to regions 860 and 865 in FIG. 8, as well as regions 160 and 165 in FIGS. 1 and 6, and the regions in each example may be formed and may function in the same or similar manner. Other components, such as transistors, capacitors, and other active or passive components, may be used here along with or instead of resistor regions 960 and 965.

Passageway 980 may provide access for a first external fluid into cavity 910, while passage way 990 may provide access for a second external fluid into cavity 920.

Again, a thickness of a vertical membrane, such as vertical membranes 100, 800, and 900, may be well-controlled by an oxide etching step as shown in FIGS. 2 and 3. However, for a given membrane thickness, a pressure sensor may have a somewhat limited range. Accordingly, embodiments of the present invention may provide pressure sensors including a number of membranes having various widths. Examples are shown in the following figures.

Figure 10:
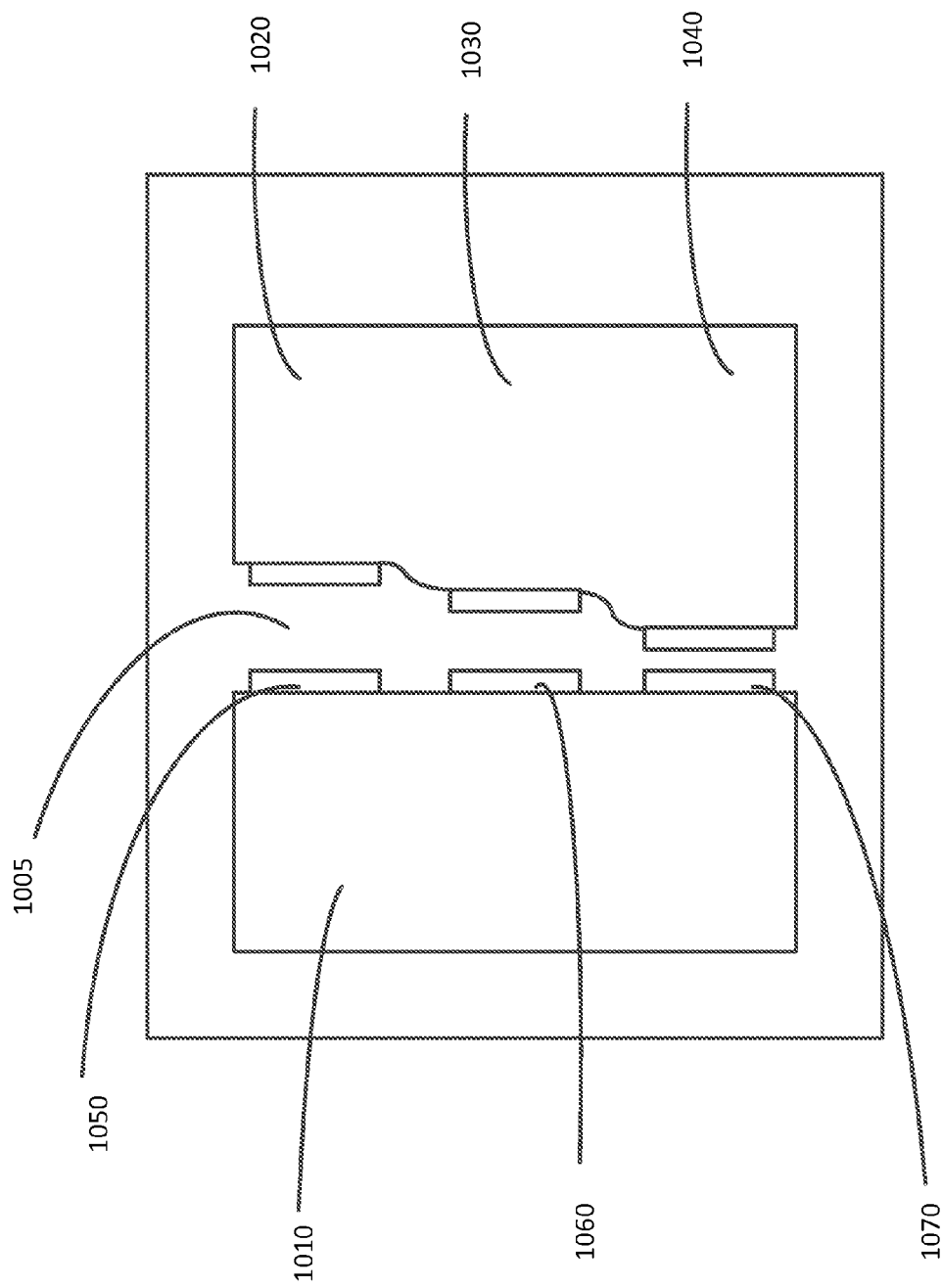
FIG. 10 illustrates a top view of a pressure sensor having an increased range according to an embodiment of the present invention.

FIG. 10 illustrates a top view of a pressure sensor having an increased range according to an embodiment of the present invention. In this example, vertical membrane 1005 may be formed between a first cavity 1010 and a second cavity formed by cavity portions 1020, 1030, and 1040. Vertical membrane 1005 may have a variable thickness along its length. The variation may be linear, it may be curved or stepped, or it may be varied in other ways. The variation may be symmetrical or the variation may be asymmetrical. Components may be placed at different points along or near vertical membrane 1005. Components at or near thinner portions of vertical membrane 1005 may be used to measure low pressures, while components at or near thicker portions of vertical membrane 1005 may be used to measure high pressures.

In this example, first components 1050 may be formed over a vertical membrane portion defined by and between cavity 1010 and cavity portion 1020, second components 1060 may be formed over a vertical membrane portion defined by and between cavity 1010 and cavity portion 1030, while third components 1070 may be formed over a vertical membrane portion defined by and between cavity 1010 and cavity portion 1040. These components, as with the components in the other examples, may be the same as or similar to components or devices in the other examples shown herein.

In this example, the relative distances or spacing between cavities and cavity portions 1110 and 1120, 1010 and 1030, and 1010 and 1040, may be varied in an asymmetrically stepped manner. At low pressures, a component 1070 between cavity 1010 and cavity portion 1040 may be measured. Specifically, since the spacing between cavity 1010 and cavity portion 1040 may be relatively small, components 1070 may have a higher sensitivity than components 1050. Components 1050 may be useful at higher pressures, since a spacing between cavity 1010 and cavity portion 1020 may be relatively larger.

In this example, either or both of the cavities 1010 and the cavity formed by cavity portions 1020, 1030, and 1040 may be sealed, or they may include passageways through a top, side, or bottom of the pressure sensor to a fluid to be measured. If a cavity is sealed, it may be sealed at a pressure of a vacuum, at a one-atmosphere pressure, or at another appropriate pressure.

Figure 11:
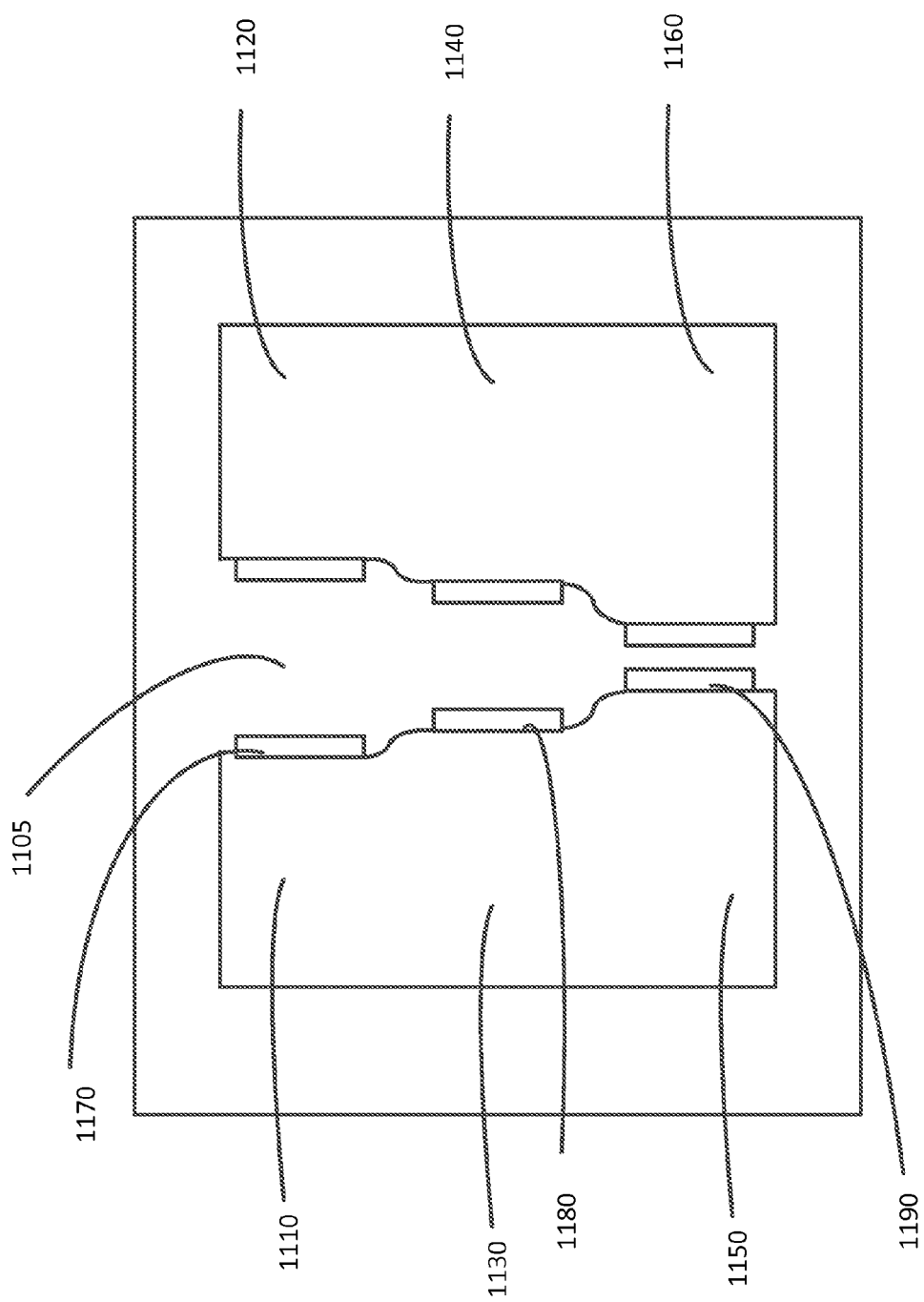
FIG. 11 illustrates a top view of another pressure sensor having an increased range according to an embodiment of the present invention.

FIG. 11 illustrates a top view of another pressure sensor having an increased range according to an embodiment of the present invention. As before, a vertical membrane 1105 may be formed between a first cavity formed by cavity portions 1110, 1130, and 1150 and a second cavity formed by cavity portions 1020, 1030, and 1040. Vertical membrane 1105 may have a variable thickness along its length. The variation may be linear, it may be curved or stepped, or it may be varied in other ways. The variation may be symmetrical or the variation may be asymmetrical. Components may be placed at different points along or near vertical membrane 1105. Components at or near thinner portions of vertical membrane 1105 may be used to measure low pressures, while components at or near thicker portions of vertical membrane 1105 may be used to measure high pressures.

In this example, first components 1070 may be formed over a vertical membrane portion defined by and between cavity portion 1010 and cavity portion 1020, second components 1080 may be formed over a vertical membrane portion defined by and between cavity portion 1030 and cavity portion 1040, while third components 1090 may be formed over a vertical membrane portion defined by and between cavity portion 1050 and cavity portion 1060. These components may be the same as or similar to components or devices in the other examples shown herein.

In this example, the relative distances or spacing between cavity portions 1110 and 1120, 1030 and 1040, and 1050 and 1060 may be varied in a symmetrically stepped manner. In this example, at low pressures, a component 1090 between cavity portion 1050 and cavity portion 1060 may be measured. Specifically, since the spacing between cavity portion 1050 and cavity portion 1060 may be relatively small, components 1090 may have a higher sensitivity than components 1070. Components 1070 may be useful at higher pressures, since a spacing between cavity portion 1010 and cavity portion 1020 may be relatively larger.

In this example, either or both of the cavities may be sealed, or they may include passageways through a top, side, or bottom of the pressure sensor to a fluid to be measured. If a cavity is sealed, it may be sealed at a pressure of a vacuum, at a one-atmosphere pressure, or at another appropriate pressure.

Figure 12:
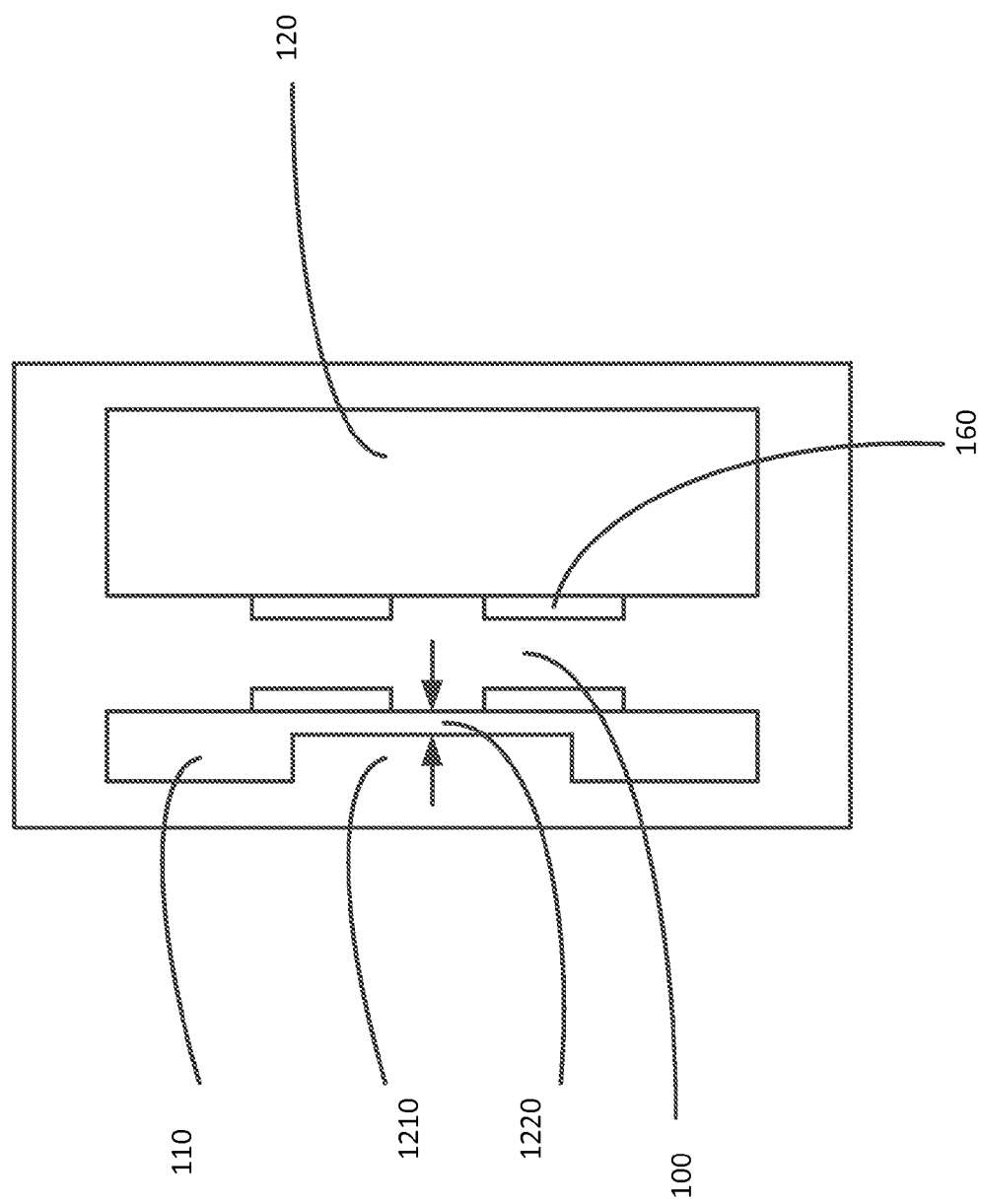
FIG. 12 illustrates a top view of a pressure sensor according to an embodiment of the present invention.

FIG. 12 illustrates a top view of a pressure sensor according to an embodiment of the present invention. This pressure sensor may include vertical diaphragm 100 between a first cavity 110 and a second cavity 120. Cavities 110 and 120 may be sealed, or may have passages to external environments either through a bottom or top of the pressure sensor. A number of components 160 may be included above vertical membrane 100. Components 160 may include one or more resistors, transistors, capacitors, or other passive or active devices or circuits. For example, two resistors may be included for a half bridge sensing circuit, while four resistors may be included for a full bridge sensing circuit.

In various embodiments of the present invention, second cavity 120 may receive external fluids. These external fluids may be under such excessive pressure that diaphragm 100 may deflect towards first cavity 110 to the extent that it may become damaged. Accordingly, embodiments of the present invention may include one or more features to limit this deflection.

In this example, stop or boss 1210 may be included. Stop or boss 1210 may extend from a wall of first cavity 110 in a direction towards vertical membrane 100. Stop or boss 1210 may come to within a distance 1220 of vertical membrane 100. In this way, vertical membrane 100 may only deflect the distance 1220. This limited distance may prevent damage to vertical membrane 100 when second cavity 120 is exposed to excessive pressures.

Figure 13:
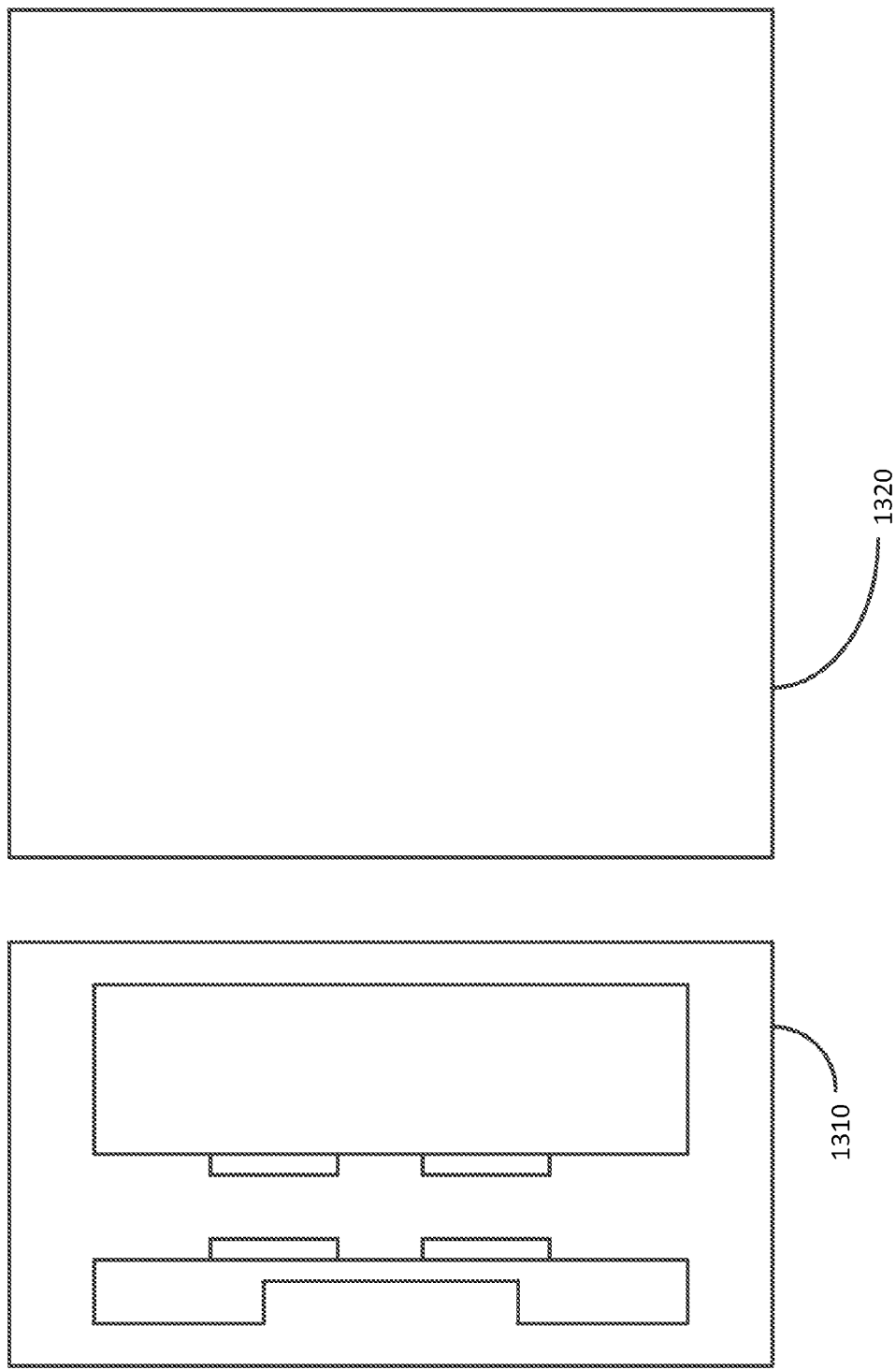
FIG. 13 illustrates a top view of a pressure sensing device according to an embodiment of the present invention.

FIG. 13 illustrates a top view of a pressure sensing device according to an embodiment of the present invention. This pressure sensing device may include pressure sensor 1310, and ASIC 1320. ASIC 1320 may be a signal processing circuit to measure and process data read from pressure sensor 1310.

Pressure sensor 1310 may have a fairly long aspect ratio. That is, a length of pressure sensor 1310 in the Y direction may be greater than its length in the X direction. This aspect ratio may allow pressure sensor 1310 and ASIC 1320 to be housed together, or formed as a single integrated device, in a space efficient manner. For example, if pressure sensor 1310 were to have an aspect ratio closer to one, the overall length of the combined pressure sensor 1310 and ASIC 1320 would be longer. Since these devices are typically housed in a rectangular package, the increase in combined length would increase the area consumed by the combined pressure sensor 1310 and ASIC 1320.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A pressure sensor comprising:
   a first wafer having a first recess and a second recess etched in a top side such that a vertical membrane is formed between the first recess and the second recess, wherein the vertical membrane has a first lateral portion between the first recess and the second recess and a second lateral portion between the first recess and the second recess, the first lateral portion thicker than the second lateral portion; and
   a second wafer having a bottom side attached to the top side of first wafer such that a first cavity is formed by the first recess and the bottom of the second wafer and a second cavity is formed by the second recess and the bottom of the second wafer.

2. The pressure sensor of claim 1 further comprising a first passage through the second wafer from a top of the second wafer to the first cavity.

3. The pressure sensor of claim 2 wherein the first lateral portion is separate from the second lateral portion.

4. The pressure sensor of claim 2 further comprising a second passage through the first wafer from a bottom of the first wafer to the second cavity such that the pressure sensor forms a differential pressure sensor.

5. The pressure sensor of claim 2 further comprising a second passage through the first wafer from a bottom of the first wafer to the second cavity.

6. The pressure sensor of claim 1 further comprising a first device over the first lateral portion and a second device over the second lateral portion.

7. The pressure sensor of claim 6 wherein the first device and the second device comprise resistors.

8. The pressure sensor of claim 7 wherein the resistors each include a p-type region extending through the second wafer into the vertical membrane in the first wafer.

9. The pressure sensor of claim 1 further comprising a stop in the first cavity extending from a wall of the first cavity opposing the vertical membrane towards the vertical membrane.

10. The pressure sensor of claim 9 wherein the stop is positioned such that a deflection of the vertical membrane may be limited.

\* \* \* \* \*